(12) United States Patent
Wang et al.

(10) Patent No.: US 9,221,416 B2
(45) Date of Patent: Dec. 29, 2015

(54) TRIM ASSEMBLY FOR COVERING AIRBAG

(75) Inventors: Ping Wang, Shanghai (CN); Yohann Boniface, Senantes (FR); Jérôme Mezière, Cergy (FR)

(73) Assignee: FAURECIA (SHANGHAI) MANAGEMENT COMPANY, LTD., Shanghai (CN)

( * ) Notice: Subject to any disclaimer, the term of this patent is extended or adjusted under 35 U.S.C. 154(b) by 0 days.

(21) Appl. No.: 14/235,983

(22) PCT Filed: Aug. 30, 2011

(86) PCT No.: PCT/CN2011/079126
§ 371 (c)(1),
(2), (4) Date: Apr. 28, 2014

(87) PCT Pub. No.: WO2013/029240
PCT Pub. Date: Mar. 7, 2013

(65) Prior Publication Data
US 2014/0339795 A1      Nov. 20, 2014

(51) Int. Cl.
*B60R 21/205* (2011.01)
*B60R 21/215* (2011.01)

(52) U.S. Cl.
CPC ..... *B60R 21/215* (2013.01); *B60R 2021/21506* (2013.01); *B60R 2021/21537* (2013.01)

(58) Field of Classification Search
CPC ................ B60R 21/215; B60R 21/205; B60R 2021/21537
USPC ............................................... 280/728.3, 732
See application file for complete search history.

(56) References Cited

U.S. PATENT DOCUMENTS

| 5,806,880 A | 9/1998 | Gray |
| 5,992,876 A * | 11/1999 | Gray .......................... 280/728.3 |

(Continued)

FOREIGN PATENT DOCUMENTS

| CN | 101932478 A | 12/2010 |
| FR | 2912104 A1 * | 8/2008 |

(Continued)

OTHER PUBLICATIONS

Oeuvrard et al., Inner covering assembly for e.g. inflatable air bag of motor vehicle, has bar fixed to support by fixation elements traversing insert, and polyamide sheet holding insert if insert is torn, where insert is placed between bar and support, Aug. 8, 2008, French Patent Office, FR 2 912 104 A1, English Abstract.*

(Continued)

*Primary Examiner* — James English
(74) *Attorney, Agent, or Firm* — Miller, Matthias & Hull LLP

(57) ABSTRACT

A trim assembly for covering an airbag, comprising: a carrier provided with a through-opening for the airbag; a surface decor; an inlay applied between the carrier and the surface decor and covering the through-opening, the inlay extending, on one side, beyond an edge of the through-opening to overlap a region of the carrier to form an hinge for an airbag flap formed by the surface decor and the inlay; and a fastening strap for fastening the inlay to the carrier at the overlapping region, wherein it comprises at least one retaining element arranged at the overlapping region, the retaining element cooperating with the inlay for retaining the airbag flap on the carrier upon an opening of the airbag flap.

12 Claims, 5 Drawing Sheets

(56) References Cited

U.S. PATENT DOCUMENTS

| | | | |
|---|---|---|---|
| 6,065,771 A * | 5/2000 | Kawakubo et al. | 280/728.3 |
| 6,113,131 A * | 9/2000 | Uehara et al. | 280/728.3 |
| 6,322,101 B1 * | 11/2001 | Suizu et al. | 280/732 |
| 7,611,163 B2 * | 11/2009 | Schweizer et al. | 280/728.3 |
| 2006/0061070 A1 * | 3/2006 | Maertens | 280/728.3 |
| 2010/0213690 A1 * | 8/2010 | Gruner | 280/728.3 |
| 2011/0181028 A1 * | 7/2011 | Brunet | 280/728.3 |
| 2012/0030980 A1 * | 2/2012 | Sella et al. | 40/663 |
| 2013/0147166 A1 * | 6/2013 | Cowelchuk et al. | 280/728.3 |
| 2013/0341895 A1 * | 12/2013 | Baumont et al. | 280/732 |

FOREIGN PATENT DOCUMENTS

| | | |
|---|---|---|
| JP | H-0840165 A | 2/1996 |
| WO | WO-2007/134884 A1 | 11/2007 |
| WO | WO-2010/037915 A1 | 4/2010 |

OTHER PUBLICATIONS

Oeuvrard et al., Inner covering assembly for e.g. inflatable air bag of motor vehicle, has bar fixed to support by fixation elements traversing insert, and polyamide sheet holding insert if insert is torn, where insert is placed between bar and support, Aug. 8, 2008, French Patent Office, FR 2 912 104 A1, Machine Translation of Description.*
Cowelchuk et al., Vehicle Interior Assembly, May 11, 2010, USPTO, U.S. Appl. No. 61/333,534, Drawings.*
Cowelchuk et al., Vehicle Interior Assembly, May 11, 2010, USPTO, U.S. Appl. No. 61/333,534, Specification.*
International Search report for Related International Application No. PCT/CN2011/079126; report dated Oct. 27, 2011.

* cited by examiner

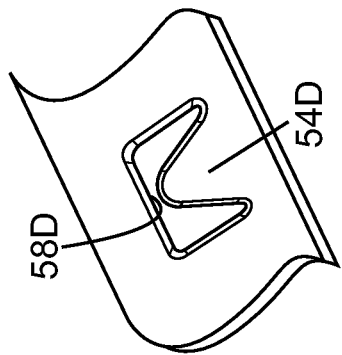
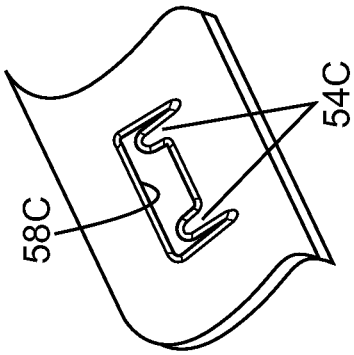
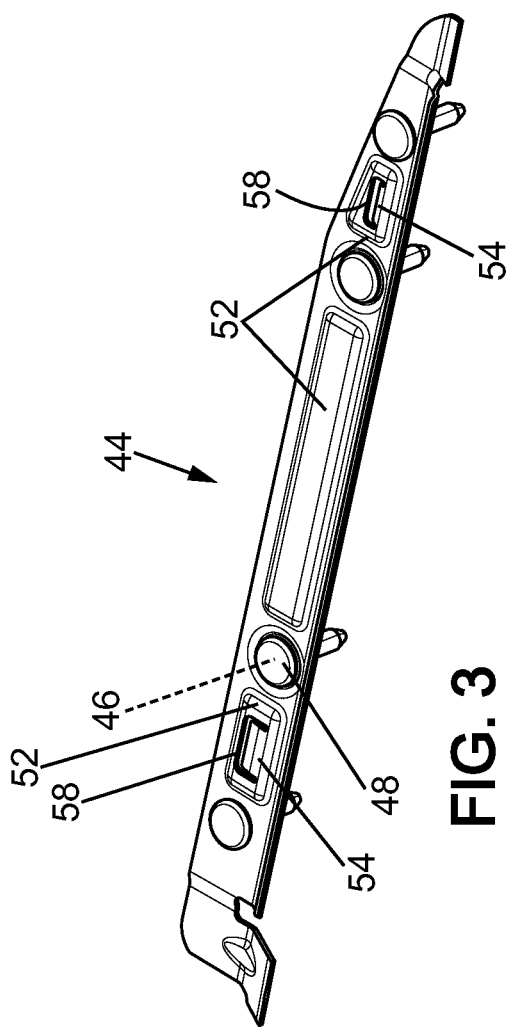
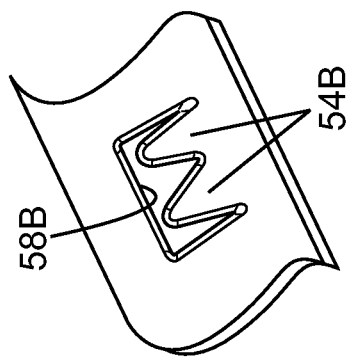
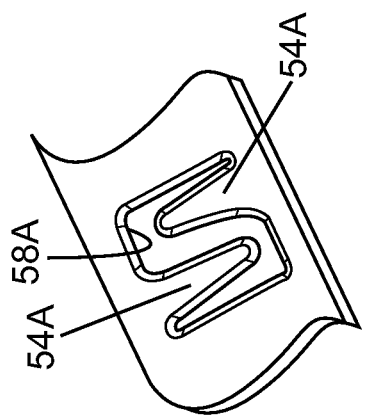

TRIM ASSEMBLY FOR COVERING AIRBAG

CROSS-REFERENCE TO RELATED APPLICATIONS

This application is a 35 USC §371 U.S. national stage filing of International Patent Application No. PCT/CN2011/079126 filed on Aug. 30, 2011.

FIELD OF THE DISCLOSURE

The present invention relates to a trim assembly for covering an airbag, comprising:
a carrier provided with a through-opening for the airbag;
a surface decor;
an inlay applied between the carrier and the surface decor and covering the through-opening, the inlay extending, on one side, beyond an edge of the through-opening to overlap a region of the carrier to form an hinge for an airbag flap formed by the surface decor and the inlay; and
a fastening strap for fastening the inlay to the carrier at the overlapping region.

BACKGROUND OF THE DISCLOSURE

An assembly of this type is known wherein the inlay is fixed to the carrier by means of fastening organs, such as studs, screws, bolts, rivets, etc., the fastening organs passing through corresponding fastening holes made in the fastening strap, the inlay and the carrier.

However, in some cases, for example in the case of a violent impact undergone by the vehicle, the opening intensity of the airbag flap upon actuation of the airbag is such that the inlay tears around the fastening holes, causing the airbag flap to be hurled in the passenger compartment.

One attempt to solve this problem is to increase the length of the inlay beyond the fastening holes.

However, this solution requires an increase of inlay material and more space to package the latter, which means an increase in terms of weight and manufacturing costs.

SUMMARY OF THE DISCLOSURE

It is an object of the present invention to provide a trim assembly with a secure operation and a low manufacturing cost.

To this end, it is provided a trim assembly for covering an airbag of the type mentioned above, wherein it comprises at least one retaining element arranged at the overlapping region, the retaining element cooperating with the inlay for retaining the airbag flap on the carrier upon an opening of the airbag flap.

With these features, even in the case of a violent impact, the inlay is retained on the carrier, thus preventing the airbag flap from being projected against the vehicle occupants or against the windscreen, thus limiting the injury risks for the occupants and the damage on the surrounding elements.

The trim assembly according to the invention may optionally comprise one or more of the following features:
the retaining element projects from a surface of the fastening strap facing the inlay;
the retaining element is formed by a cut-out provided in the fastening strap;
the cut-out has a U shape;
the fastening strap comprises at least one embossing, the retaining element being arranged at the embossing;
the retaining element projects from a surface of the carrier facing the inlay;
the retaining element is angled relative to the general plane of the carrier;
the retaining element extends away from the edge of the through-opening;
the retaining element comprises a retaining tab;
the retaining element comprises a retaining finger;
it comprises a plurality of retaining elements arranged along the overlapping region;
the inlay is manufactured from a thread fabric; and
it is an instrument panel or a part of an instrument panel.

It is also provided an airbag arrangement comprising an airbag module, wherein it comprises a trim assembly as previously defined and fixed to the airbag module.

BRIEF DESCRIPTION OF THE DRAWINGS

Other characteristics and advantages of the invention will readily appear from the following description of embodiments thereof, provided as non-limitative examples, and of the accompanying drawings, on which:

FIG. 3 is a perspective view of a fastening strap of the trim assembly of FIG. 1 with retaining elements according to a first embodiment of the invention;

FIGS. 5A to 5D are perspective views illustrating variants of the retaining element.

DETAILED DESCRIPTION OF THE DISCLOSURE

On the different Figures, the same reference signs indicate like or similar elements.

Figure 1:
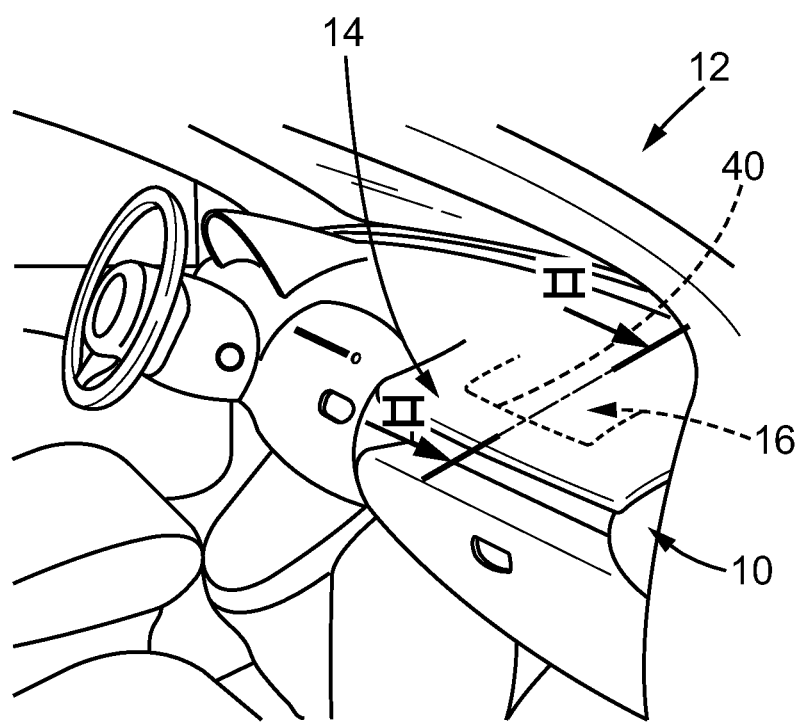
FIG. 1 is a schematic perspective view of the passenger compartment of an automotive vehicle equipped with a trim assembly according to the invention.

FIG. 1 illustrates an instrument panel 10 of an automotive vehicle 12.

The orientation and position terms used in the present description, such as "front", "rear", "top", "bottom", "longitudinal", "transversal", etc., have to be understood relative to the usual orientations of an automotive vehicle.

The instrument panel 10 comprises an airbag arrangement comprising a trim assembly 14 and an airbag module 16 housed under the trim assembly 14, on the passenger side (on the right on FIG. 1).

Figure 2:
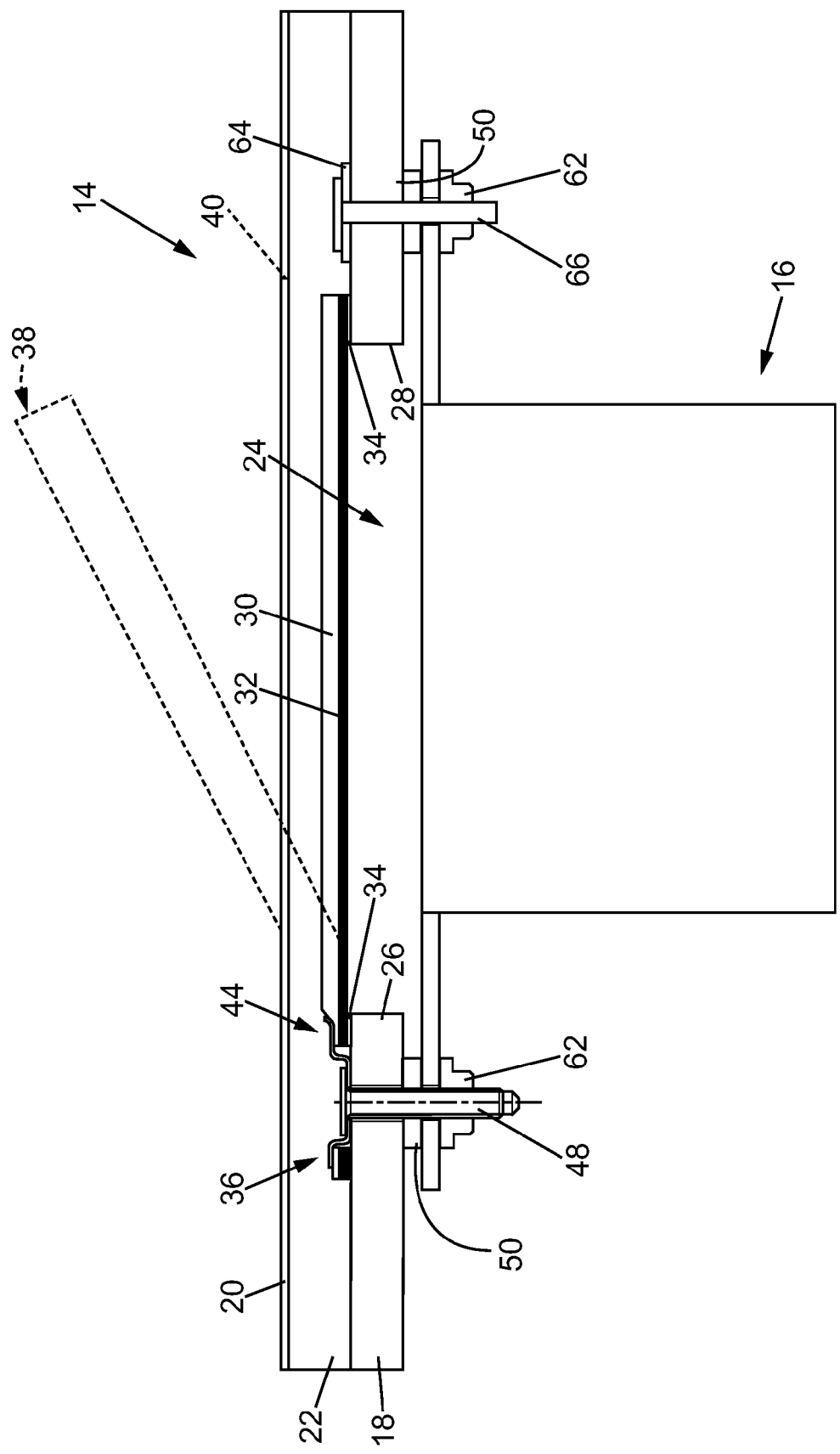
FIG. 2 is a longitudinal vertical cross-sectional view along line II-II of FIG. 1.

As best seen on FIG. 2, the trim assembly 14 comprises a carrier 18, a surface decor 20 and a foamed intermediate layer 22.

The carrier 18 is made for example from polypropylene, from a plastic containing polypropylene or from PC-ABS.

A through-opening 24, having a front edge 26 and a rear edge 28, is recessed in the carrier 18, above the airbag module 16, for the passage of the airbag upon actuation of the airbag module 16.

The surface decor 20 is to be seen by a passenger of the vehicle 12 and consists of a skin provided with pleasant optical and/or haptic properties, for example made from leather, a fabric or a plastic material such as PVC, TPO or PU.

The intermediate layer 22, arranged between the carrier 18 and the surface decor 20, comprises essentially a foam, for example a polyurethane foam.

The trim assembly 14 comprises an inlay 30 manufactured from a thread fabric, for example a polyamide fabric, which is applied into and forms part of the intermediate layer 22.

The inlay 30 is made from a three-dimensional thread fabric, that is to say from a thread fabric which is knitted in the three directions and which forms a plurality of meshes. Accordingly, the inlay 30 has a certain thickness which provides the inlay 30 with a certain rigidity.

The inlay 30 covers the through-opening 24 and is at least partially, advantageously completely, penetrated by the foam forming the intermediate layer 22.

A sealing foil 32 is applied under the inlay 30 and fixed on the carrier 18, for example with glue 34, all around the through-opening 24 to ensure a sealing of the through-opening 24, particularly to prevent foam from entering the through-opening 24 during the formation of the intermediate layer 22.

The inlay 30 and the sealing foil 32 extend, on their front side, beyond the front edge 26 of the through-opening 24 to overlap a front region of the carrier 18, thus forming an overlapping region 36 of the inlay 30, the sealing foil 32 and the carrier 18.

In the overlapping region 36, the inlay 30 serves as a hinge for an airbag flap 38 formed by the surface decor 20 and the intermediate layer 22 with the inlay 30 and the sealing foil 32.

In order to ease the opening of the airbag flap 38, a weakening line 40 is formed in the surface decor 20 along the border of the inlay 30 or beyond except the border in the overlapping region 36, thus having, in a plane view (FIG. 1), a U-shape which opens frontward. The weakening line 40 may alternatively have another shape, such as a trapezoidal shape.

The weakening line 40 is obtained by material removing, for example by realizing a notch in the surface decor 20.

The inlay 30 is further fastened to the carrier 18 at the overlapping region 36 by means of a fastening strap 44.

With reference to FIG. 3, the fastening strap 44 is an elongated piece of metal extending in the overlapping region 36, along the front edge 26 of the through-opening 24, and comprising a plurality of fastening holes 46, four fastening holes 46 in the present embodiment, distributed along the fastening strap 44.

Each fastening hole 46 is put in correspondence with corresponding holes provided in the inlay 30, the sealing foil 32 and the carrier 18 to receive a fastening stud 48 cooperating with a fastening nut 50 to firmly secure the inlay 30 to the carrier 18 (FIG. 2). The fastening studs 48 are for example welded on the fastening strap 44.

The fastening strap 44 also comprises a plurality of embossings 52, three embossings 52 in the present embodiment, distributed along the fastening strap 44, between the fastening holes 46, and obtained for example by stamping.

The embossings 52 enable to rigidificate the fastening strap 44 and to limit the stresses on the fastening strap 44 during the mounting of the assembly which could result in blemishes visible on the surface decor 20.

In order to prevent, at all events, a complete tearing-off of the inlay 30, and consequently a projection of the airbag flap 38 in the passenger compartment, the trim assembly 14 comprises at least one retaining element 54 arranged at the overlapping region 36 for retaining the inlay 30 on the carrier 18.

In the embodiment of FIG. 3, the trim assembly 14 comprises two retaining elements 54 arranged along the fastening strap 44 and projecting from the bottom surface 56 of the fastening strap 44 facing the inlay 30.

The retaining elements 54 are advantageously arranged at the embossings 52, between the fastening holes 46.

Figure 4:
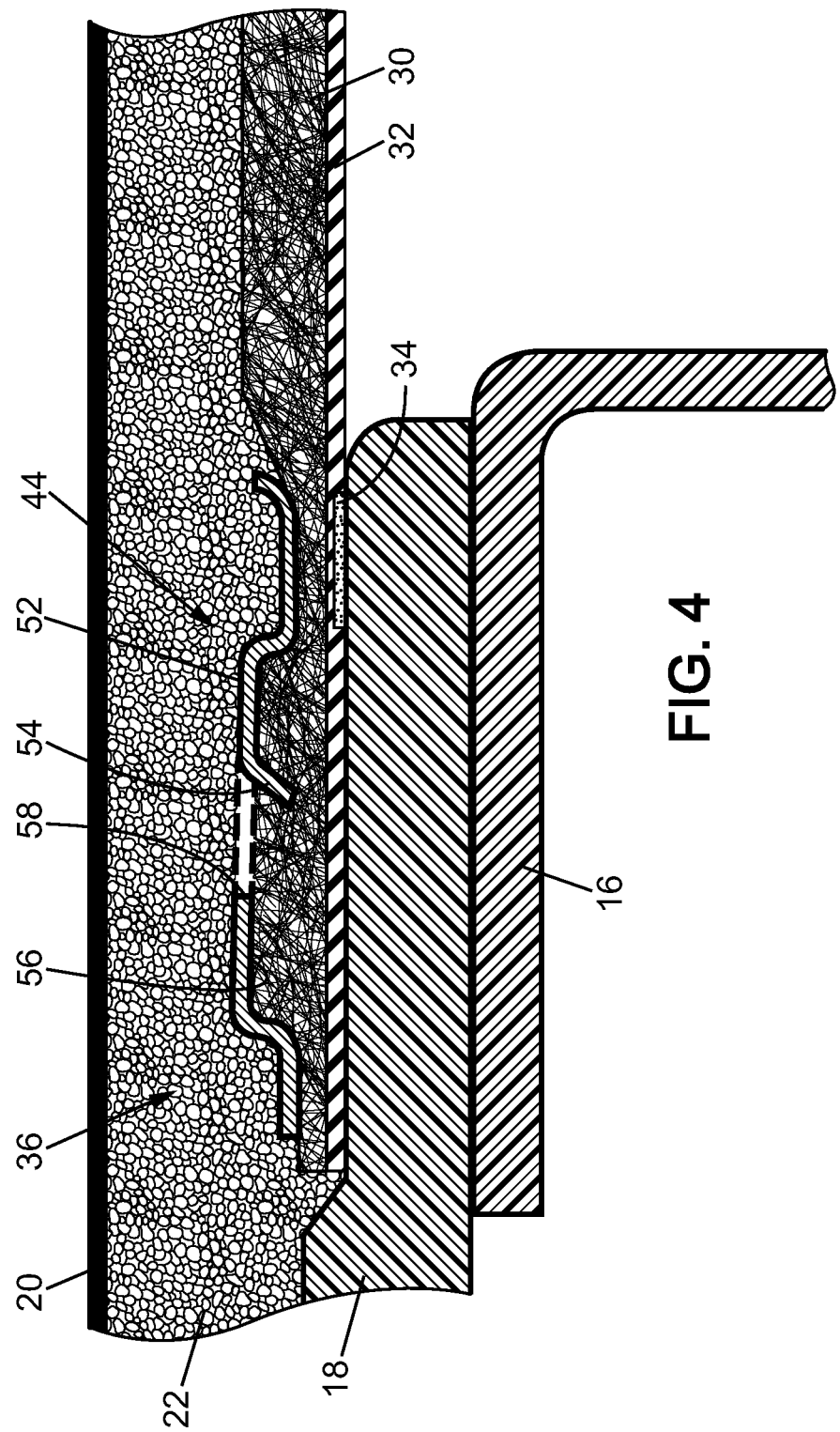
FIG. 4 is a view similar to that of FIG. 2 illustrating one of the retaining elements of FIG. 3.

The retaining elements 54 are angled relative to the general plane of the carrier 18 and extend away from the front edge 26 of the through-opening 24 (FIG. 4). The retaining elements 54 are angle in the direction of the carrier 18.

Each retaining element 54 is formed by a cut-out 58 formed in the fastening strap 44 and obtained for example by punching.

On FIG. 3, the cut-outs 58 are substantially U-shaped, thus forming substantially rectangular retaining tabs 54.

However, many variants relative to the shape, the number and the orientation of the retaining elements 54 can be considered, as illustrated in FIGS. 5A to 5D.

FIG. 5A shows a cut-out 58A having an S-shape resulting in two retaining fingers 54A offset relative to each other along the fastening strap 44A and extending in opposite directions, one retaining finger 54A extending away from the front edge 26 of the through-opening 24 and the other retaining finger 54A extending toward the front edge 26 of the through-opening 24.

FIGS. 5B and 5C show respective cut-outs 58B and 58C resulting respectively in two adjacent retaining fingers 54B and 54C extending in the same direction.

FIG. 5D shows a cut-out 58D forming one retaining finger 54D.

Other variants of the retaining elements comprise for example a cut-out having the shape of an hourglass and forming two retaining fingers facing each other and extending in opposite directions, a cut-out forming two opposed retaining tabs or a cut-out having the shape of a four-leaf clover forming four retaining fingers extending along respective directions converging toward a same point.

The retaining elements 54 cooperate with the meshes of the inlay 30 and oppose to a movement of the inlay 30 toward the passenger compartment.

The presence of the cut-outs 58 in the fastening strap 44 is very advantageous in that it enables a flow of foam to penetrate the portion of the inlay 30 which is sandwiched between the fastening strap 44 and the carrier 18 during the formation of the intermediate layer 22.

Consequently, the binding between the intermediate layer 22 and the inlay 30 is increased.

Besides, this enables also to equilibrate the foam pressure on either side of the fastening strap 44, thus limiting the stresses on the fastening strap 44 which could result in blemishes visible on the surface decor 20.

Figure 6:
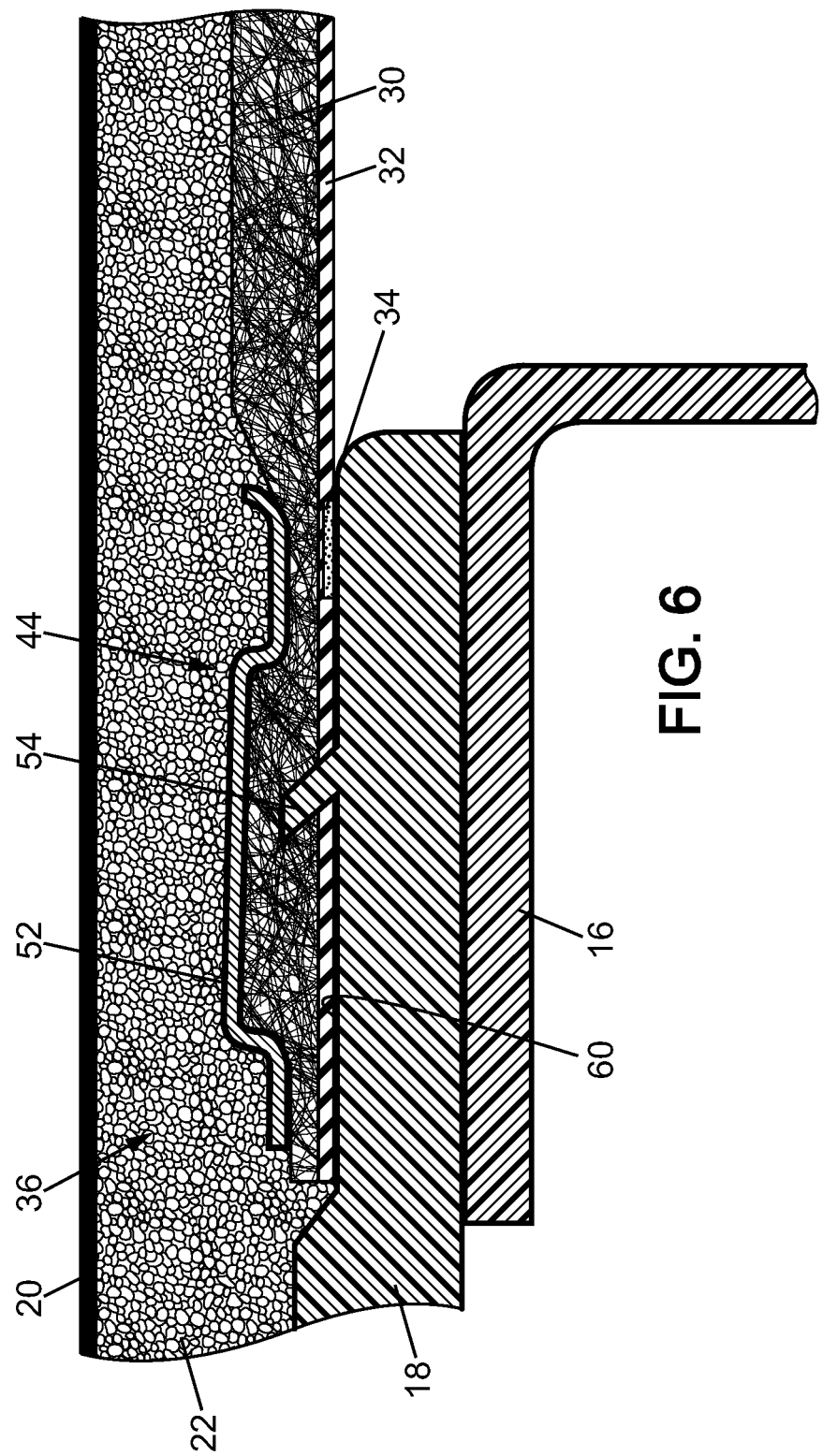
FIG. 6 is a view similar to that of FIG. 2 illustrating a retaining element according to a second embodiment of the invention.

FIG. 6 illustrates a second embodiment wherein the retaining elements 54 project from the top surface 60 of the carrier 18 facing the inlay 30.

The retaining elements 54 are advantageously arranged under the embossings 52 of the fastening strap 44, between the corresponding holes of the carrier 18 receiving the fastening studs 48.

Referring back to FIG. 2, the fastening strap 44 also serves for fixing the airbag module 16 to the carrier 18 in the overlapping region 36, additional nuts 62 being provided and engaging with the fastening studs 48.

The airbag module 16 is further fixed to the carrier 18 along the side and rear edges of the through-opening 24 by a fixing plate 64 provided with holes, respective studs 66 passing through these holes and through corresponding holes in the carrier 18 and cooperating with fastening nuts 50 and additional nuts 62.

When the airbag module 16 is actuated in response to an impact undergone by the vehicle 12, the surface decor 20 tears at the weakening line 40 and the surface decor 20 and the intermediate layer 22 with the inlay 30 and the sealing foil 32 release from the carrier 18 when the airbag flap 38 opens under the effect of the deployment of the airbag.

In any case, and especially in the case of a violent impact, the airbag flap 38 is prevented from being completely released from the carrier 18 and hurled into the passenger compartment or against the windscreen by the inlay 30 being retained by the retaining elements 54.

The invention thus provides a trim assembly for covering an airbag with a secure operation and a low manufacturing cost.

The invention claimed is:

1. A trim assembly for covering an airbag, comprising:
    a carrier provided with a through-opening for the airbag;
    a surface decor;
    an inlay applied between the carrier and the surface decor and covering the through-opening, the inlay extending, on one side, beyond an edge of the through-opening to overlap a region of the carrier to define an overlapping region to form a hinge for an airbag flap formed by the surface decor and the inlay; and
    a fastening strap for fastening the inlay to the carrier at the overlapping region, wherein the trim assembly further comprises at least one retaining element arranged at the overlapping region, the retaining element cooperating with the inlay for retaining the airbag flap on the carrier upon an opening of the airbag flap;
    wherein the retaining element is angled relative to a general plane of the carrier, and wherein the retaining element extends away from the edge of the through-opening.

2. The trim assembly according to claim 1, wherein the retaining element projects from a surface of the fastening strap facing the inlay.

3. The trim assembly according to claim 1, wherein the at least one retaining element has a U shape.

4. The trim assembly according to claim 2, wherein the fastening strap comprises at least one embossing, the retaining element being arranged at the embossing.

5. The trim assembly according to claim 1, wherein the retaining element projects from a surface of the carrier facing the inlay.

6. The trim assembly according to claim 1, wherein the retaining element comprises a retaining tab.

7. The trim assembly according to claim 1, wherein the retaining element comprises a retaining finger.

8. The trim assembly according to claim 1, comprising a plurality of retaining elements arranged along the overlapping region.

9. The trim assembly according to claim 1, wherein the inlay is manufactured from a thread fabric.

10. The trim assembly according to claim 1, constituting an instrument panel or a part of an instrument panel.

11. An airbag arrangement comprising an airbag module, wherein the airbag arrangement comprises the trim assembly according to claim 1, said trim assembly being fixed to the airbag module.

12. The trim assembly according to claim 2, wherein the retaining element is formed by a cut-out provided in the fastening strap.

* * * * *

UNITED STATES PATENT AND TRADEMARK OFFICE
CERTIFICATE OF CORRECTION

PATENT NO.        : 9,221,416 B2
APPLICATION NO.   : 14/235983
DATED             : December 29, 2015
INVENTOR(S)       : Wang et al.

It is certified that error appears in the above-identified patent and that said Letters Patent is hereby corrected as shown below:

On the Title Page, Item (73) the Assignee should read:
        "FAURECIA (CHINA) HOLDING CO., LTD"

Signed and Sealed this
Thirty-first Day of May, 2016

Michelle K. Lee
*Director of the United States Patent and Trademark Office*